US011445292B2

(12) United States Patent
Honji et al.

(10) Patent No.: US 11,445,292 B2
(45) Date of Patent: Sep. 13, 2022

(54) SPEAKER SYSTEM AND VEHICLE DOOR

(71) Applicant: YAMAHA Corporation, Hamamatsu (JP)

(72) Inventors: Yoshikazu Honji, Hamamatsu (JP); Hideki Harada, Hamamatsu (JP)

(73) Assignee: YAMAHA Corporation, Shizuoka (JP)

( * ) Notice: Subject to any disclaimer, the term of this patent is extended or adjusted under 35 U.S.C. 154(b) by 0 days.

(21) Appl. No.: 17/073,173

(22) PCT Filed: Apr. 17, 2018

(86) PCT No.: PCT/JP2018/015869
§ 371 (c)(1),
(2) Date: Oct. 16, 2020

(87) PCT Pub. No.: WO2019/202662
PCT Pub. Date: Oct. 24, 2019

(65) Prior Publication Data
US 2021/0266662 A1 Aug. 26, 2021

(51) Int. Cl.
H04R 1/34 (2006.01)
B60R 11/02 (2006.01)
H04R 1/02 (2006.01)
B60J 5/04 (2006.01)
B60R 13/02 (2006.01)
B60R 11/00 (2006.01)

(52) U.S. Cl.
CPC ............ *H04R 1/345* (2013.01); *B60J 5/0413* (2013.01); *B60R 11/0217* (2013.01); *B60R 13/0243* (2013.01); *H04R 1/025* (2013.01); *B60R 2011/0021* (2013.01); *H04R 2499/13* (2013.01)

(58) Field of Classification Search
CPC combination set(s) only.
See application file for complete search history.

(56) References Cited

U.S. PATENT DOCUMENTS 5,736,689 A * 4/1998 Van Hout .............. H04R 1/025
181/150
6,389,147 B1 * 5/2002 Rush ........................ H04R 5/02
381/86
6,409,250 B1 * 6/2002 Schultheiss ............ B60H 1/248
296/146.7

(Continued)

FOREIGN PATENT DOCUMENTS

JP 2003063316 A 3/2003
JP 2005039454 A 2/2005

(Continued)

OTHER PUBLICATIONS

Notice of Reasons of Refusal in JP 2020-514826 dated Sep. 2, 2021.

Primary Examiner — Oyesola C Ojo
(74) Attorney, Agent, or Firm — Chip Law Group

(57) ABSTRACT

Disclosed is a speaker system that includes a first panel that is an outer plate of a vehicle door, a second panel that is disposed on a vehicle interior side of the vehicle door, a third panel that is disposed between the first panel and the second panel, a speaker unit that has a sound emitting surface for emitting a sound toward a vehicle interior, and spacers that are disposed between the speaker unit and the third panel.

11 Claims, 5 Drawing Sheets

(56) References Cited

U.S. PATENT DOCUMENTS

| | | | | |
|---|---|---|---|---|
| 7,313,247 | B1* | 12/2007 | Tilli | H04R 1/025 |
| | | | | 381/86 |
| 11,001,128 | B2* | 5/2021 | Fortin | B60J 5/045 |
| 2005/0013459 | A1* | 1/2005 | Maekawa | B60R 11/0217 |
| | | | | 381/349 |
| 2006/0151910 | A1* | 7/2006 | Schoemann | B60J 5/0416 |
| | | | | 264/250 |
| 2008/0116722 | A1* | 5/2008 | Garcia Martin | B60J 5/0416 |
| | | | | 296/146.7 |
| 2008/0150324 | A1* | 6/2008 | Jayasuriya | B60R 11/0217 |
| | | | | 296/187.12 |
| 2014/0086444 | A1* | 3/2014 | Muller | B60J 5/0413 |
| | | | | 381/389 |
| 2015/0078580 | A1* | 3/2015 | Schwerdtfeger | H04R 1/323 |
| | | | | 381/86 |

FOREIGN PATENT DOCUMENTS

| | | | | |
|---|---|---|---|---|
| JP | 2005219515 | A | 8/2005 | |
| JP | 2009137416 | A * | 6/2009 | B60J 5/04 |
| JP | 2009137416 | A | 6/2009 | |
| JP | 2017100570 | A | 6/2017 | |
| WO | 2009144818 | A1 | 12/2009 | |
| WO | WO-2009144818 | A1 * | 12/2009 | H04R 1/288 |

\* cited by examiner

SPEAKER SYSTEM AND VEHICLE DOOR

CROSS REFERENCE TO RELATED APPLICATIONS

This application is a continuation of International Patent Application No. PCT/JP2018/015869 filed Apr. 17, 2018. Each of the above-referenced applications is hereby incorporated herein by reference in its entirety.

BACKGROUND

The present disclosure relates to a speaker system and a vehicle door including a speaker system.

In some cases, a vehicle door includes an outer panel, a door trim disposed on a vehicle interior side, and an inner panel disposed between the outer panel and the door trim. Door functional parts, such as a speaker unit and a window regulator, are attached to the inner panel. In some cases, as described, for example, in Japanese Patent Laid-Open No. 2009-137416, the speaker unit is attached to the inner panel via a module carrier plate instead of being directly attached to the inner panel. In any case, the speaker unit is disposed rearward from the door trim. Further, a cylindrical blocking member for blocking a gap between the door trim and an outer periphery of a sound emitting surface of the speaker unit is disposed between the door trim and the outer periphery of the sound emitting surface of the speaker unit.

SUMMARY

As described above, the speaker unit to be attached to the vehicle door is positioned such that the sound emitting surface of the speaker unit is disposed rearward from the door trim. In such an existing speaker system, a thickness of the vehicle door increases due to the use of the blocking member. Part of a sound emitted from the speaker unit is reflected from or absorbed by an inner surface of the cylindrical blocking member and then introduced into a vehicle interior. As sounds are reflected from or absorbed by the inner surface of the blocking member, there arises a problem in which acoustic characteristics of a high pitch range degrade.

In view of the above circumstances, the present disclosure has been made to provide a speaker system and a vehicle door that improve, for example, acoustic characteristics of a high pitch range.

According to an aspect of the present disclosure, there is provided a speaker system including a first panel, a second panel, a third panel, a speaker unit, and a spacer. The first panel is an outer plate of a vehicle door. The second panel is disposed on a vehicle interior side of the vehicle door. The third panel is disposed between the first panel and the second panel. The speaker unit has a sound emitting surface for emitting a sound toward a vehicle interior. The spacer is disposed between the speaker unit and the third panel.

According to another aspect of the present disclosure, there is provided a vehicle door including the above-described speaker system.

DETAILED DESCRIPTION OF THE PREFERRED EMBODIMENTS

1. First Embodiment

Figure 1:
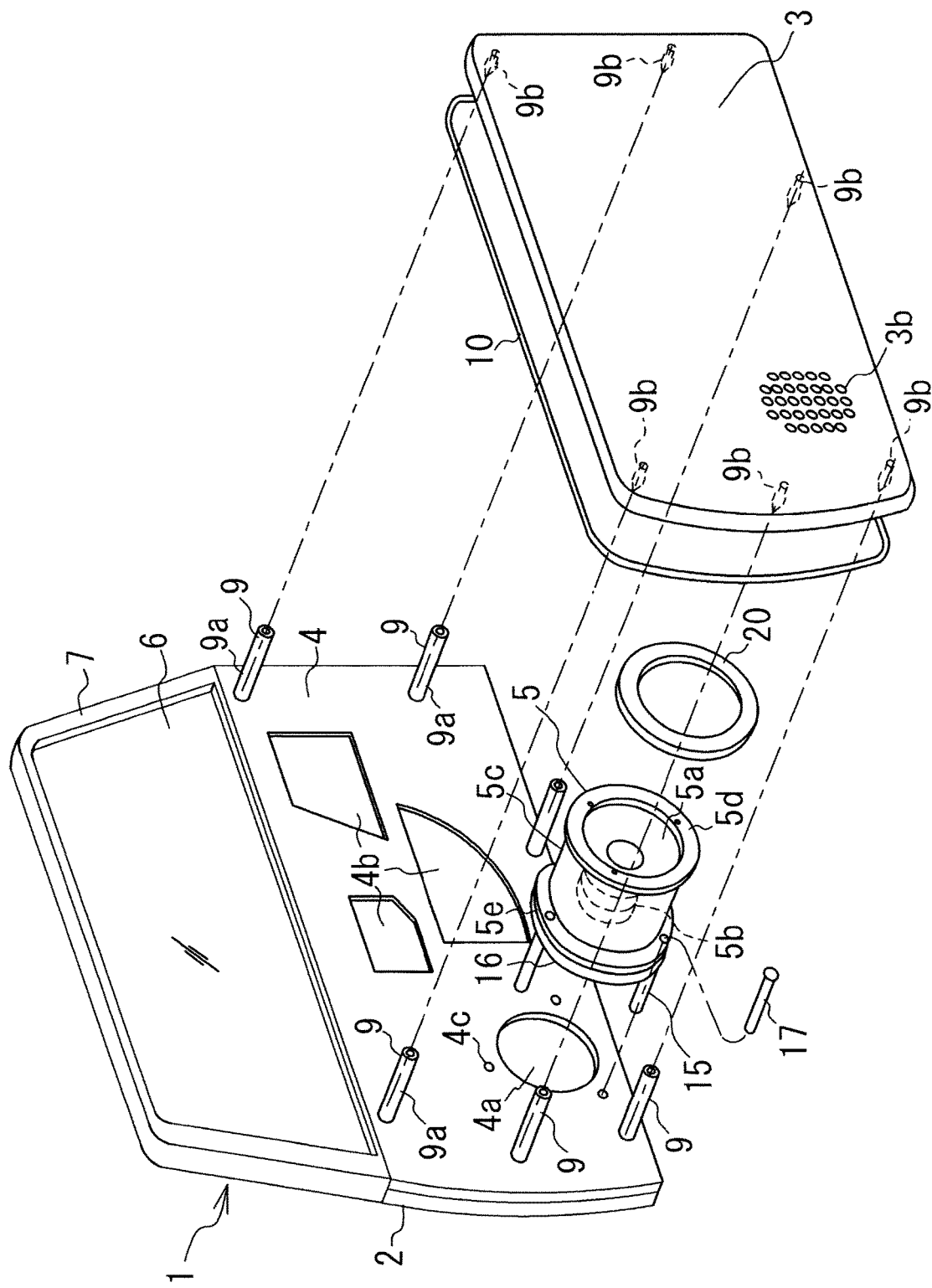
FIG. 1 is an exploded perspective view of a vehicle door including a speaker system according to a first embodiment of the present disclosure.

A first embodiment of the present disclosure will now be described with reference to the accompanying drawings. It should be noted that the dimensions and scales of various parts depicted in the drawings are made different, as appropriate, from actual ones. Further, the embodiments described below are preferred embodiments of the present disclosure. Therefore, various technically preferred limitations are imposed on the embodiments described below. However, the scope of the present disclosure is not limited to the embodiments described below as far as the description given below does not include a particular statement of limitations imposed on the present disclosure.

Figure 2:
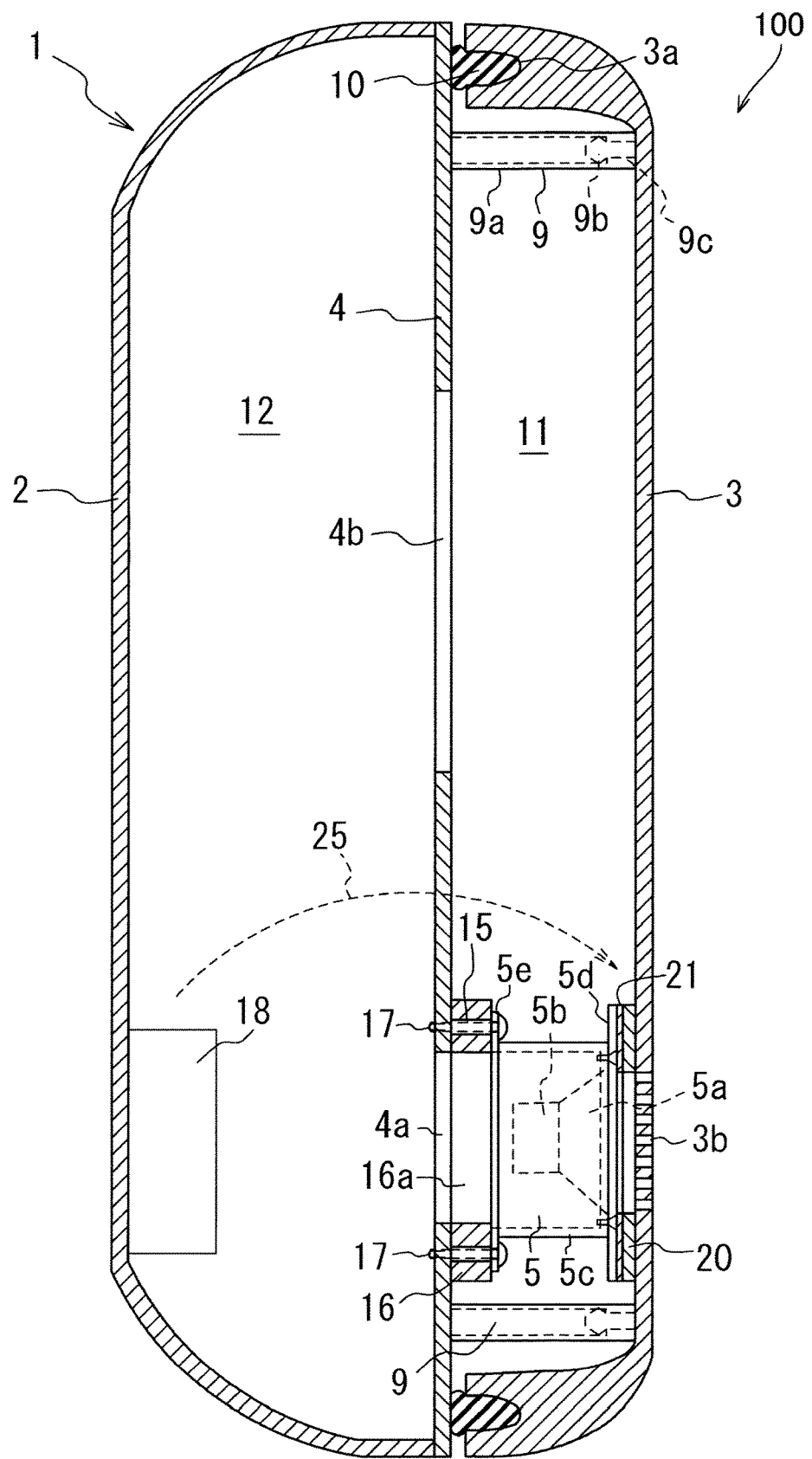
FIG. 2 is a longitudinal sectional view of the speaker system.
Figure 3:
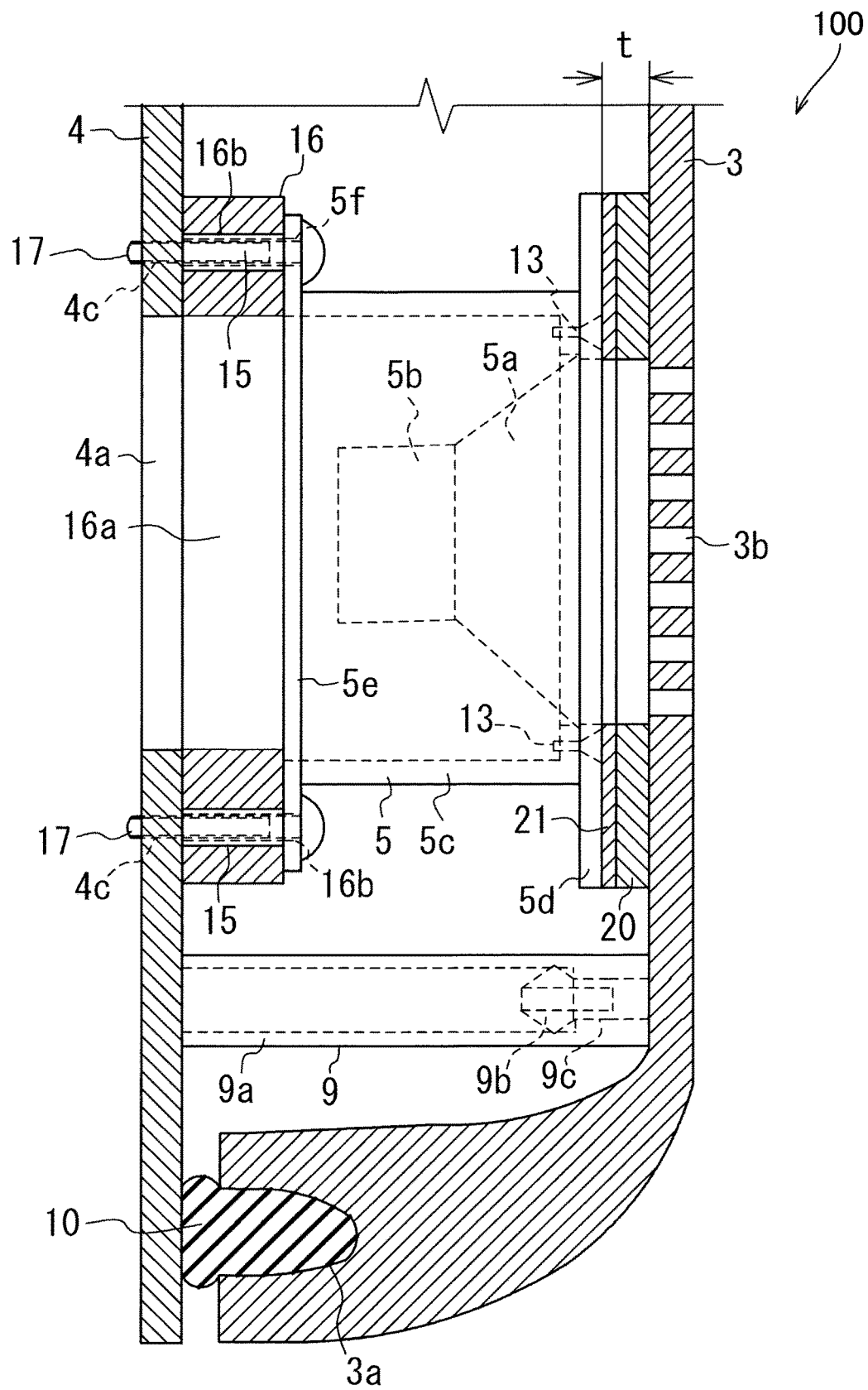
FIG. 3 is a partially enlarged sectional view of FIG. 2.

FIG. 1 is an exploded perspective view illustrating a configuration of a vehicle door including a speaker system according to the first embodiment. FIG. 2 is a longitudinal sectional view illustrating the first embodiment. FIG. 3 is a partially enlarged view of FIG. 2. A speaker system 100 includes a speaker unit 5 and an enclosure. In the present embodiment, a part of a vehicle door 1 functions as an enclosure.

The vehicle door 1 includes a first panel 2 and a second panel 3. The first panel 2 is an outer plate that is positioned outside. The second panel 3 is disposed as an interior finishing material for a vehicle interior side of the vehicle door 1 and referred to as a door trim. Further, the vehicle door 1 includes a third panel 4 and a speaker unit 5. The third panel 4 is disposed between the first panel 2 and the second panel 3 and referred to as an inner panel. The speaker unit 5 has a sound emitting surface 5a for emitting a sound toward a vehicle interior and is mounted on the third panel 4.

A steel plate is generally used for the first panel 2 and the third panel 4. The first panel 2 and the third panel 4 are coupled together. For example, an aluminum alloy or a carbon material may be used for the first panel 2 and the third panel 4. For example, a synthetic resin molded plate is used for the second panel 3. A frame body 7 is disposed on a top of the first panel 2 and third panel 4. A windowpane 6 is vertically movably housed in the frame body 7.

An opening 4a and a plurality of openings 4b are formed in the third panel 4 in order to house the speaker unit 5. Undepicted parts for vertically moving the windowpane 6, such as a motor and a door lock actuator, can be housed in the openings 4b. In the present embodiment, at least some of the openings 4b are covered neither by various parts nor by dedicated members for covering the openings 4b.

The second panel 3 is fastened to the third panel 4 by a plurality of coupling mechanisms 9. The coupling mechanisms 9 in the present embodiment each include a receiver 9a and an insert 9b. The receiver 9a is cylindrically shaped and disposed on the third panel 4. The insert 9b is disposed integrally with the second panel 3. The insert 9b is an elastic body. The insert 9b experiences diameter reduction when it is inserted into an insertion hole 9c in the receiver 9a, and then recovers its original diameter when it is placed inside the receiver 9a. The coupling mechanisms 9 fasten the second panel 3 to the third panel 4. The coupling mechanisms 9 may have various other structures as far as they fasten the second panel 3 to the third panel 4. For example, the coupling mechanisms 9 may be structured such that the receiver 9a is disposed on a side toward the second panel 3 while the insert 9b is disposed on a side toward the third panel 4.

A groove-shaped packing mount 3a is disposed along an outer rim of the second panel 3. A packing 10 is inserted into the packing mount 3a. As the packing 10 is placed between the second panel 3 and the third panel 4, a space 11 enclosed by the second panel 3 and the third panel 4 remains airtight. At least some openings 4b formed in the third panel 4 allow the space 11 to communicate with a space 12 enclosed by the first panel 2 and the third panel 4.

The speaker unit 5 in the present example includes a speaker main body 5b and a housing 5c. The speaker main body 5b includes, for example, a magnet and a diaphragm. The housing 5c is cylindrically shaped to house the speaker main body 5b. The speaker main body 5b has a brim 5d on the side toward the second panel 3. The speaker unit 5 is formed by fastening the brim 5d to the housing 5c with screws 13.

The housing 5c has an opening on the side toward the third panel 4. The housing 5c has a brim 5e on the outside of the opening. The brim 5e has mounting holes 5f for mounting the speaker unit 5. Spacers 15 are members that are disposed between the speaker unit 5 and the third panel 4 to maintain a fixed interval between the speaker unit 5 and the third panel 4. Using the spacers 15 makes it possible to position the sound emitting surface 5a of the speaker unit 5 closer to the second panel 3. The spacers 15 are, for example, cylindrical in shape. In the present embodiment, the cylindrical spacers 15 are positioned concentrically with the mounting holes 5f formed in the brim 5e and fastened to the surface of the brim 5e that is on the side toward the third panel 4. The spacers 15 may be fastened to the brim 5e, for example, by integral molding, welding, or bonding, or by inserting the spacers 15 into holes formed in the brim 5e.

An elastic body 16 is disposed between the speaker unit 5 and the third panel 4. The elastic body 16 has an opening 16a that is connected to the opening 4a in the third panel 4. The third panel 4 has screw holes 4c for mounting the speaker unit 5. The speaker unit 5 is mounted on the third panel 4 when mounting screws 17 are inserted through the mounting holes 5f in the brim 5e, the spacers 15, and mounting holes 16b formed in the elastic body 16, and screwed into the screw holes 4c in the third panel 4. The elastic body 16 restrains or prevents sounds emitted toward a rear surface of the speaker unit 5 from leaking out of the housing 5c. An alternative configuration may be adopted so as to form through-holes in the third panel 4 instead of the screw holes 4c, insert the mounting screws 17 through the through-holes, and secure the mounting screws 17 with nuts.

A plurality of openings 3b are formed in an area of the second panel 3 that faces the sound emitting surface 5a of the speaker unit 5. The openings 3b are used such that a sound generated by the speaker unit 5 is emitted into the vehicle interior. A sound absorbing material 18 is disposed on the surface of the first panel 2 that faces the rear surface of the speaker unit 5. The sound absorbing material 18 absorbs the sound generated by the speaker unit 5 so as to suppress standing waves.

In the present embodiment, an elastic body 20 is disposed between the surface of the speaker unit 5 on the side toward the second panel 3 and the surface of the second panel 3 on the side toward the third panel 4, and shaped like a ring so as to enclose the openings 3b in the second panel 3. Although various materials may be used for the elastic body 20, it is preferable that, for example, an elastic material, such as elastic rubber, or an elastic synthetic resin foam material be used.

The elastic body 20 in the present example is attached with an adhesive 21 to the brim 5d on the speaker unit 5 that is on the side toward the sound emitting surface 5a.

In a state where the second panel 3 is fastened to the third panel 4 by the coupling mechanisms 9, the elastic body 20 is sandwiched between the speaker unit 5 and the second panel 3. The elastic body 20 covers a gap between the second panel 3 and the outer periphery of the sound emitting surface 5a of the speaker unit 5. The sound emitting openings 3b formed in the second panel 3 are positioned in an area enclosed by the elastic body 20 when the speaker unit 5 is planarly viewed from the vehicle interior.

As described above, the speaker system 100 according to the present embodiment is configured such that the spacers 15 are disposed between the speaker unit 5 and the third panel 4. This makes it possible to shorten a distance t depicted in FIG. 3 between the second panel 3 and the surface of the speaker unit 5 on the side toward the second panel 3. In the present example, the surface of the speaker unit 5 on the side toward the second panel 3 is the surface of the brim 5d on the side toward the second panel 3. As the distance t can be shortened, it is possible to reduce the number of times a sound emitted from the sound emitting surface 5a is reflected from an inner surface of the elastic body 20, which is a member between the second panel 3 and the speaker unit 5, or reduce a ratio at which the emitted sound is absorbed by the inner surface of the elastic body 20. Consequently, sound quality of a high pitch range can be improved.

It is preferable that the distance t between the second panel 3 and the surface of the speaker unit 5 on the side toward the second panel 3 be 0.5 mm or longer and not longer than 10 mm. One reason is a distance t of longer than 10 mm increases the number of times a sound is reflected from the inner circumferential surface of the elastic body 20 or increases the ratio at which a sound emitted from the sound emitting surface 5a is absorbed by the inner circumferential surface of the elastic body 20. This degrades the sound quality of a high pitch range. Another reason is that a distance t of 0.5 mm or longer makes it easy to mount the speaker unit 5 and mount the elastic body 20 and other parts. It is more preferable that the distance t be 1 mm or longer and not longer than 5 mm. A distance t of not longer than 5 mm further reduces the reflection of a sound from the inner circumferential surface of the elastic body 20 or other member disposed between the speaker unit 5 and the second panel 3 or the ratio at which a sound emitted from the sound emitting surface 5a is absorbed by the inner circumferential surface of the elastic body 20. This makes it possible to improve the sound quality of a high pitch range. Moreover, a distance t of 1 mm or longer makes it easier to mount the speaker unit 5 and the elastic body 20.

In the present embodiment, the elastic body 20 is sandwiched between the speaker unit 5 and the second panel 3. As the elastic body 20 elastically deforms to tolerate a positioning error of the speaker unit 5, it is easy to achieve the positioning of the speaker unit 5. Further, sounds emitted from the rear surface of the speaker unit 5 are restrained or prevented from propagating toward the sound emitting surface 5a of the speaker unit 5 as indicated by a broken line 25 in FIG. 2. Therefore, the sound quality of a forward radiated sound originally generated from the sound emitting surface 5a of the speaker unit 5 can be restrained or prevented from being degraded under the influence of a backward radiated sound propagating from the rear surface of the speaker unit 5. As a result, a sound that should originally be generated from the sound emitting surface 5a of the speaker unit 5 can easily be obtained to improve the sound quality.

Moreover, in the present embodiment, the space 12 formed between the first panel 2 and the third panel 4 and the space 11 formed between the second panel 3 and the third panel 4 communicate with each other through the openings 4b. Therefore, the cubic volume of the enclosure of the speaker unit 5 is equal to the sum of the cubic volume of the space 11 and the cubic volume of the space 12. Consequently, the cabinet volume of a speaker system is larger than that of an existing speaker system that uses only the space 12 as the enclosure. This makes it possible to lower the lowest resonance frequency and raise a reproduction sound pressure in a low pitch range. However, the present disclosure is also applicable to a configuration where the space 11 and the space 12 are separated from each other.

It should be noted that the openings 4b in the third panel 4 may be covered, for example, by a synthetic resin film. Such a film has a sufficiently low transmission loss in the low pitch range. Therefore, even in a case where such a film is used, the space enclosed by the first panel 2 and the second panel 3 functions as an integral enclosure particularly in the low pitch range.

2. Second Embodiment

Figure 4:
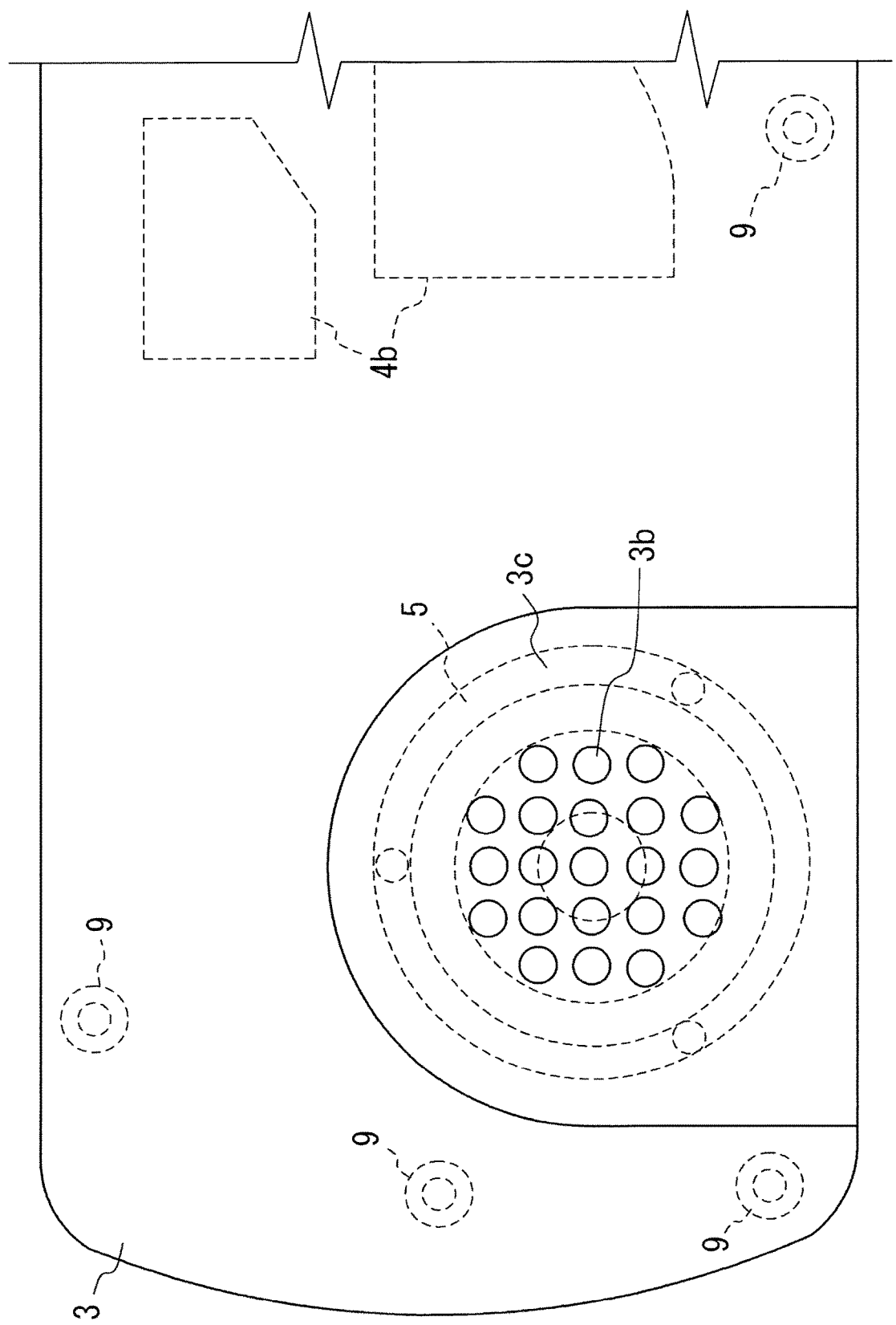
FIG. 4 is a view of the speaker system according to a second embodiment of the present disclosure, as viewed from a vehicle interior side of a second panel.
Figure 5:
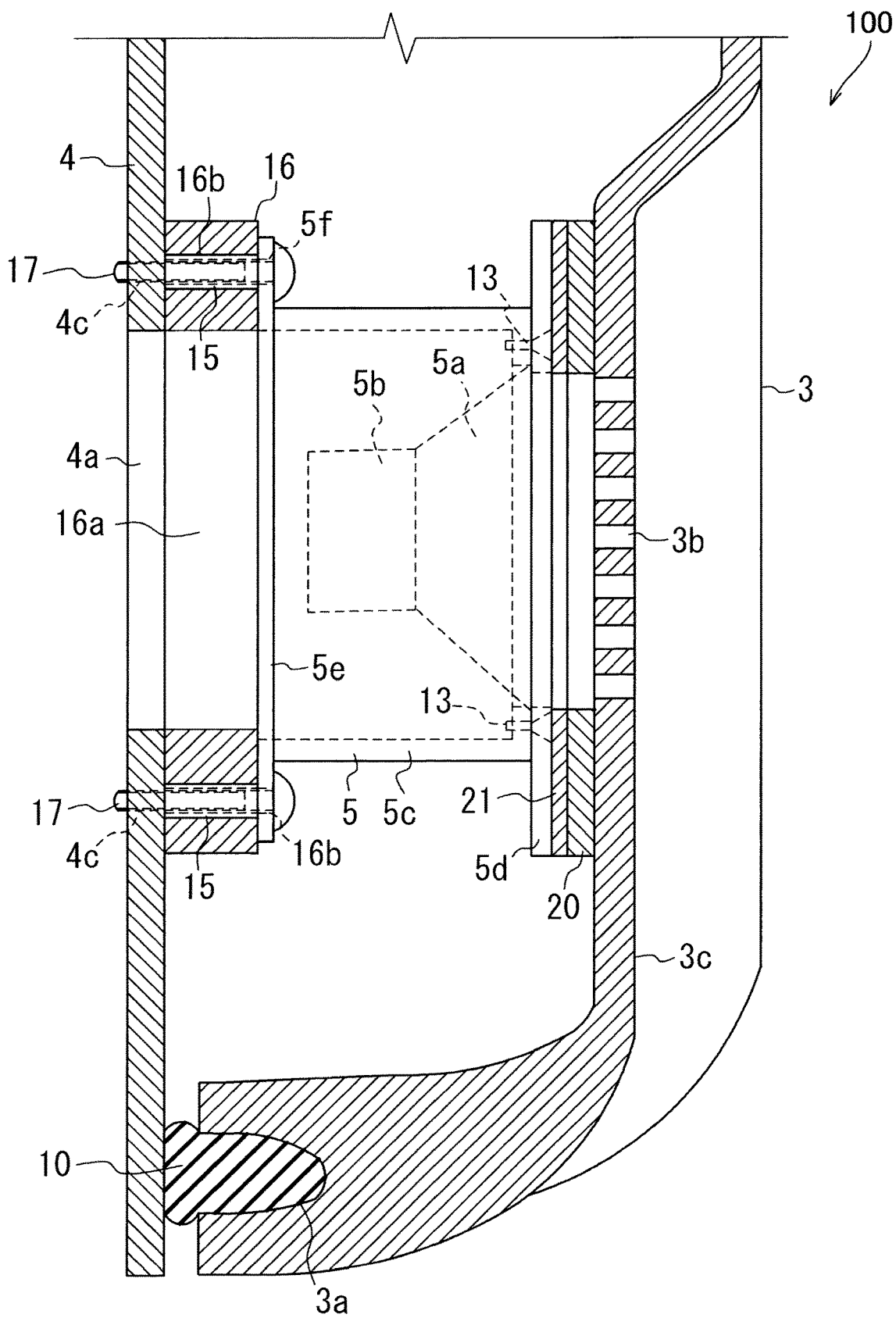
FIG. 5 is a longitudinal sectional view of the speaker system according to the second embodiment of the present disclosure.

FIG. 4 is a view of the speaker system according to a second embodiment of the present disclosure, as viewed from a vehicle interior side of a second panel. FIG. 5 is a longitudinal sectional view illustrating a configuration of the speaker system according to the second embodiment.

In the present embodiment, a portion 3c of the second panel 3 that opposes the sound emitting surface 5a of the speaker unit 5 is recessed toward the third panel 4. The present embodiment is similar to the first embodiment in the structure of the speaker unit 5, in the structure for mounting the speaker unit 5 on the third panel 4, and in the structure for mounting the elastic body 20.

When the portion of the second panel 3 that opposes the speaker unit 5 is recessed as described in conjunction with the present embodiment, the surface of the second panel 3 that opposes the speaker unit 5 can be positioned closer to the sound emitting surface 5a of the speaker unit 5. Therefore, the thickness of the vehicle door 1 can be reduced. This makes it possible to reduce the size of the speaker unit 5 and the size of the elastic body 16 disposed between the speaker unit 5 and the third panel 4. As a result, materials can be saved.

Modifications

The foregoing embodiments may be variously modified. Concrete examples of modified aspects are illustrated below. Two or more aspects appropriately selected from the following examples may be combined as needed unless they conflict with one another.

(1) The above-described spacers 15 may be disposed separately from the speaker unit 5 and the third panel 4. Further, the spacers 15 may be disposed integrally with the third panel 4.

(2) In the foregoing embodiments, the plurality of cylindrical spacers 15 are used to obtain the distance between the speaker unit 5 and the third panel 4. The spacers 15 may be of any shape if it is able to position the speaker unit 5 closer to the second panel 3. The spacers 15 may be shaped like a ring. In such a case, through-holes may be formed in the ring-shaped spacers 15 in correspondence with the mounting holes 5f in the brim 5e, and the mounting screws 17 may be inserted through the mounting holes 5f and the through-holes and then screwed into the screw holes 5c.

(3) In the foregoing embodiments, the speaker unit 5 has the brim 5d. However, an alternative is to use the speaker unit 5 from which the brim 5d is removed. When such an alternative configuration is adopted, the surface of the speaker unit 5 that is on the side toward the second panel 3 is the surface of the housing 5c that is on the side toward the second panel 3.

Aspects Understood from at Least One of Embodiments and Modifications

The following aspects are understood from at least one of the foregoing embodiments and modifications.

It is preferable that an aspect of a speaker system include a first panel, a second panel, a third panel, a speaker unit, and spacers. The first panel in a vehicle door is in contact with an outside. The second panel in the vehicle door is disposed on a side toward a vehicle interior. The third panel is disposed between the first panel and the second panel. The speaker unit has a sound emitting surface for emitting a sound toward the vehicle interior. The spacers are disposed between the speaker unit and the third panel. This aspect is able to shorten a distance between the second panel and the sound emitting surface of the speaker unit. Shortening the above distance reduces a ratio at which a sound emitted from the sound emitting surface is reflected or absorbed by an inner surface of a member between the second panel and the speaker unit. This makes it possible to improve sound quality of a high pitch range.

As an aspect of the above-described speaker system, it is preferable that the distance between the second panel and the second panel side surface of the speaker unit be 0.5 mm or longer and not longer than 10 mm. This aspect is able to reduce the ratio at which a sound is reflected or absorbed by an inner circumferential surface of a member between the second panel and the speaker unit. This makes it possible to improve the sound quality of a high pitch range. Further, this aspect makes it easy to mount the speaker unit 5 and mount the elastic bodies and other parts.

As an aspect of the above-described speaker system, it is preferable that an elastic body be included and sandwiched between a third panel side surface of the second panel and a second panel side surface of the speaker unit. According to this aspect, the elastic body elastically deforms to tolerate a positioning error of the speaker unit. This makes it easy to achieve the positioning of the speaker unit. Further, sounds emitted from a rear surface of the speaker unit are prevented from propagating toward the sound emitting surface of the speaker unit. Therefore, the sound quality of a forward radiated sound originally generated from the sound emitting surface of the speaker unit can be restrained or prevented from being degraded under the influence of a backward radiated sound propagating from the rear surface of the speaker unit. As a result, a sound that should originally be generated from the sound emitting surface of the speaker unit can easily be obtained to improve the sound quality.

As an aspect of the above-described speaker system, it is preferable that a portion of the second panel that opposes the sound emitting surface of the speaker unit be recessed toward the third panel. According to this aspect, the surface of the second panel that opposes the speaker unit can be positioned closer to the sound emitting surface of the speaker unit. Therefore, a length of the spacers in a thickness direction of the vehicle door can be reduced. This makes it possible to reduce the size of the speaker unit and the size of the elastic body disposed between the speaker unit and the third panel while maintaining the improved sound quality. As a result, materials can be saved.

As an aspect of the above-described speaker system, it is preferable that the spacers be cylindrically shaped, and that the speaker unit have a speaker main body, a housing, and mounting screws. The housing houses the speaker main body and has mounting holes. The mounting screws are inserted through the mounting holes and the spacers in order to mount the speaker unit on the third panel. According to this aspect, using the cylindrical spacers makes it possible to maintain an interval between the third panel and the speaker unit with small members.

It should be understood by those skilled in the art that various modifications, combinations, sub-combinations and alterations may occur depending on design requirements and other factors insofar as they are within the scope of the appended claims or the equivalents thereof.

What is claimed is:

1. A speaker system, comprising:
   a first panel that is an outer plate of a vehicle door;
   a second panel that is disposed on a vehicle interior side of the vehicle door, wherein the second panel corresponds to a door trim of the vehicle door;
   a third panel that is disposed between the first panel and the second panel;
   a speaker unit that has a sound emitting surface configured to emit a sound toward a vehicle interior, wherein
      a distance between a surface of the door trim and a surface of the speaker unit is between 0.5 mm and 10 mm,
      the surface of the door trim is on a side toward the third panel, and
      the surface of the speaker unit is on a side toward the door trim;
   spacers that are disposed between the speaker unit and the third panel; and
   a first elastic body between the surface of the door trim and the surface of the speaker unit.

2. The speaker system according to claim 1, wherein
   a portion of the second panel is opposite to the sound emitting surface of the speaker unit; and
   the portion of the second panel is recessed toward the third panel.

3. The speaker system according to claim 1, wherein
   the spacers are cylindrically shaped,
   the speaker unit further includes a speaker main body and a housing,
   the housing is adapted to house the speaker main body,
   the housing includes mounting holes, and
   the speaker unit is mounted on the third panel by mounting screws inserted through the mounting holes and the spacers.

4. A vehicle door, comprising:
   a speaker system including:
      a first panel that is an outer plate of the vehicle door;
      a second panel that is disposed on a vehicle interior side of the vehicle door, wherein the second panel corresponds to a door trim of the vehicle door;
      a third panel that is disposed between the first panel and the second panel;
      a speaker unit that has a sound emitting surface configured to emit a sound toward a vehicle interior, wherein
         a distance between a surface of the door trim and a surface of the speaker unit is between 0.5 mm and 10 mm,
         the surface of the door trim is on a side toward the third panel, and
         the surface of the speaker unit is on a side toward the door trim;
      spacers that are disposed between the speaker unit and the third panel; and
      an elastic body between the surface of the door trim and the surface of the speaker unit.

5. The speaker system according to claim 1, further comprising a sound absorbing material on a surface of the first panel.

6. The speaker system according to claim 1, wherein the third panel includes an opening covered by a synthetic resin film.

7. The speaker system according to claim 1, further comprising at least one coupling mechanism configured to couple the second panel and the third panel, wherein
   the at least one coupling mechanism includes:
      a cylindrical shaped receiver member on the third panel, and
      a second elastic body on the second panel, and
   the second elastic body is configured to fit into the cylindrical shaped receiver member.

8. The speaker system according to claim 1, wherein each of the first panel and the third panel includes one of an aluminum alloy or a carbon material.

9. The speaker system according to claim 1, wherein the second panel includes a synthetic resin molded plate.

10. The speaker system according to claim 1, further comprising a third elastic body between the third panel and the speaker unit, wherein the third elastic body has an opening that is connected to an opening in the third panel.

11. The speaker system according to claim 1, wherein
    the speaker unit comprising a housing,
    the housing has a brim on a rear side of the speaker unit toward the third panel,
    the brim is configured to mount the speaker unit to the third panel, and
    the spacers extend from the third panel to the rear side of the housing.

* * * * *